United States Patent [19]
Min

[11] Patent Number: 5,627,673
[45] Date of Patent: May 6, 1997

[54] ARRAY OF THIN FILM ACTUATED MIRRORS FOR USE IN AN OPTICAL PROJECTION SYSTEM

[75] Inventor: Yong-Ki Min, Seoul, Rep. of Korea

[73] Assignee: Daewoo Electronics Co., Ltd., Seoul, Rep. of Korea

[21] Appl. No.: 431,522

[22] Filed: Apr. 28, 1995

[30] Foreign Application Priority Data

Apr. 30, 1994 [KR] Rep. of Korea .................. 94-9505

[51] Int. Cl.$^6$ .................. G02B 26/00; G02B 5/08
[52] U.S. Cl. .................. 359/290; 359/295; 359/850
[58] Field of Search .................. 359/290, 291, 359/295, 846, 848, 850

[56] References Cited

U.S. PATENT DOCUMENTS 5,481,396 1/1996 Ji et al. .................. 359/295

Primary Examiner—Georgia Y. Epps
Assistant Examiner—John P. Cornely
Attorney, Agent, or Firm—Anderson Kill & Olick P.C.

[57] ABSTRACT

An array of M×N thin film actuated mirrors for use in an optical projection system comprises an active matrix, an array of M×N supporting members, and an array of M×N thin film actuating structures. Each of the actuating structures includes a first, an electrodisplacive, a second layers and an elastic layer, wherein the first and the seconds layers are placed on top and bottom of the electrodisplacive layer, and the elastic layer is placed on bottom of the second layer. The first layer is divided into a proximal and a distal ends. In each of the actuated mirrors, the proximal end of the first layer is connected to a conduction line pattern to thereby act as a bias electrode and the second layer is connected electrically to one of the transistors through a conduit placed in each of the supporting members to thereby act as a signal electrode. The distal end of the first layer functions as a mirror for reflecting the light beam.

13 Claims, 7 Drawing Sheets

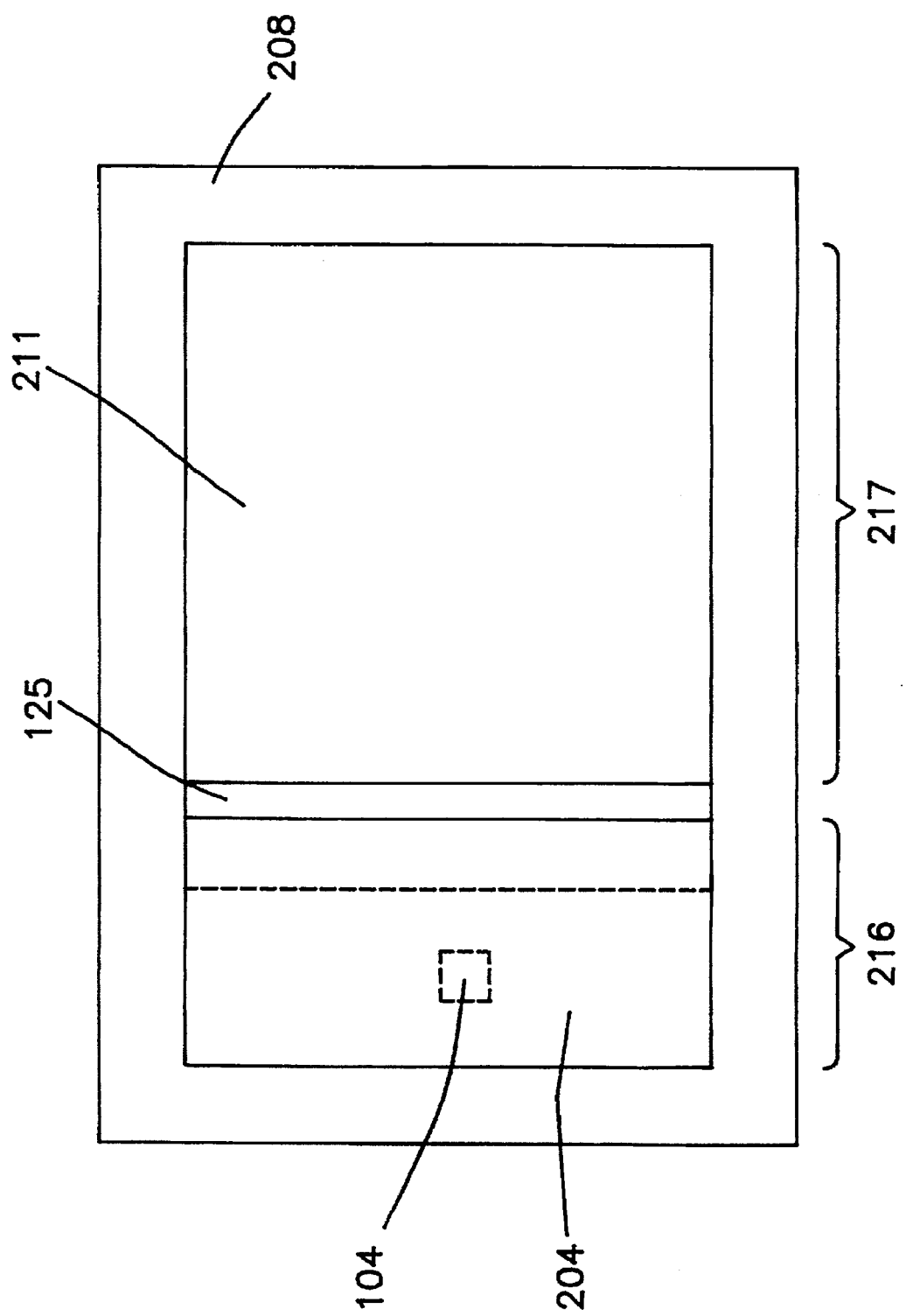

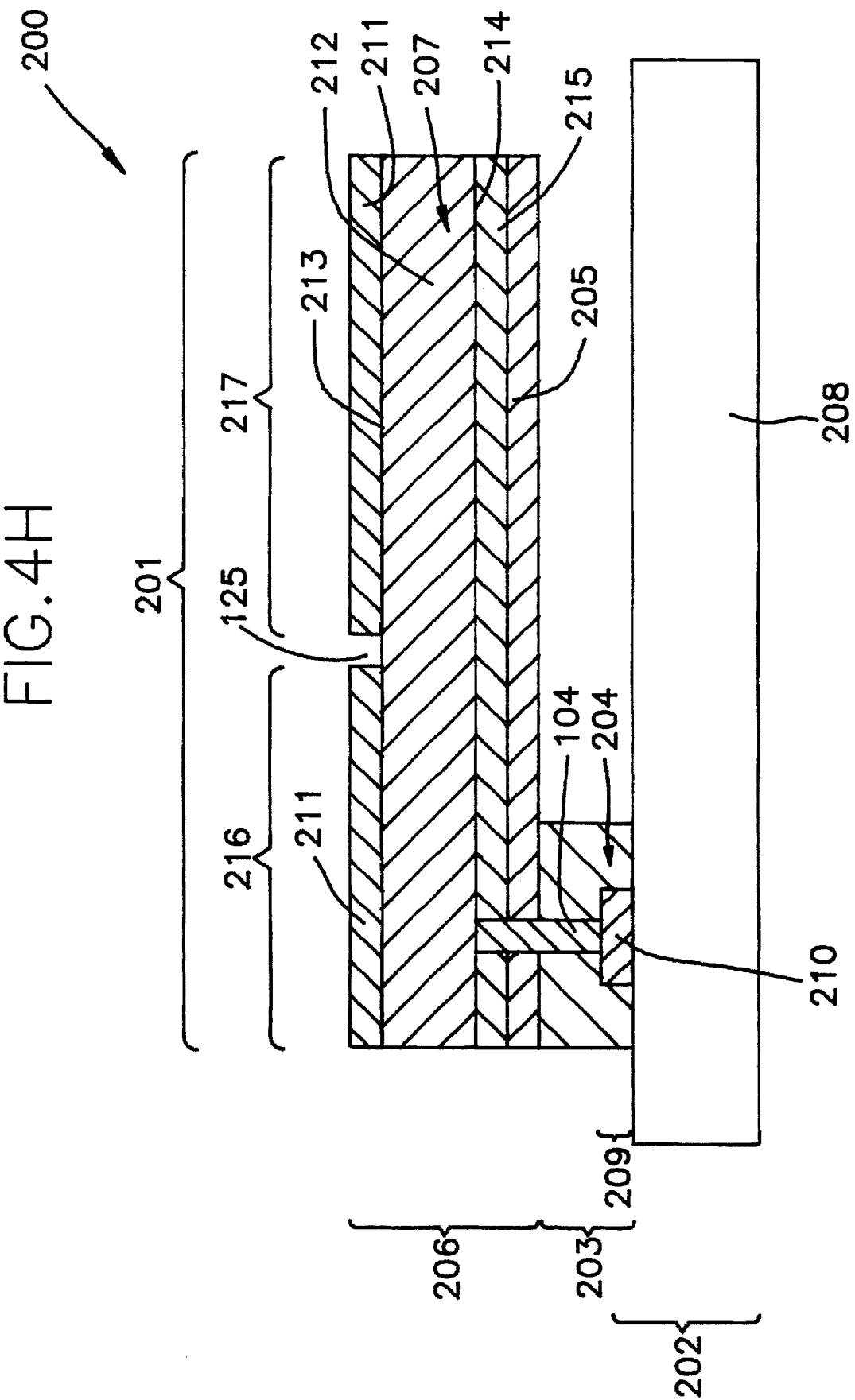

ARRAY OF THIN FILM ACTUATED MIRRORS FOR USE IN AN OPTICAL PROJECTION SYSTEM

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors, wherein each of the mirrors is coupled with each of the actuators. The actuators may be made of an electrodispiacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of flight reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an array 10 of M×N thin film actuated mirrors 11 for use in an optical projection system, disclosed in a copending commonly owned application, U.S. Ser. No. 08/331,399, entitled "THIN FILM ACTUATED MIRROR ARRAY AND METHOD FOR THE MANUFACTURE THEREOF", comprising an active matrix 12, an array 13 of M×N thin film actuating structures 14, an array 15 of M×N supporting members 16 and an array 17 of M×N mirrors 18.

The active matrix 12 includes a substrate 19, an array of M×N transistors (not shown) and an array 20 of M×N connecting terminals 21. Each of the actuating structures 14 in the array 10 is provided with at least a thin film layer 22 of an electrodisplacive material such as a piezoelectric material, e.g., lead zirconium titanate(PZT) or an electrostrictive material, e.g., lead magnesium niobate(PMN), a first electrode 23, a second electrode 24 and an elastic layer 25 made of a ceramic, wherein the first and second electrodes 23, 24 are placed on top and bottom of the electrodisplacive layer 22, and the elastic layer 25 is placed on bottom of the second electrode 24, respectively. Each of the supporting member 16 is used for holding each of the actuating structures 14 in place by cantilevering each of the actuating structures 14 and for electrically connecting each of the actuating structures 14 and the active matrix 12 by being provided with a conduit 26 made of a metal, e.g., tungsten (W). Furthermore, each of the mirrors 18, made of a light reflecting material, e.g., aluminum(Al), is placed on top of each of the actuating structures 14.

In the thin film actuated mirror array 10, an electrical signal is applied across the electrodisplacive layer 22 located between the first and second electrodes 23, 24 in each of the actuating structures 14, causing a deformation thereof, which will, in turn, deform the mirror 18 placed on top thereof, thereby changing the optical path of the incident light beam.

There are a number of problems associated with the above-described array 10 of thin film actuated mirrors 11. The first and foremost to be mentioned, is the reduction in the optical efficiency of the array 10 due to the stress developed between the electrodisplacive layer 22 and the elastic layer 25 in each of the actuated mirrors 11 therein during the operation thereof. The stress developed therebetween will cause cracks to be formed on the mirror 18 and the first electrode 23 or will, in some cases, even force the mirror 18 and the first electrode 23 to be peeled off from each of the actuated mirrors 11, and, furthermore, the stress will force the electrodisplacive layer 22, and hence the mirror 18 and the first electrode 23 attached on top thereof, to bend in an irregular manner, all of which will contribute to the reducing of the optical efficiency of the array 10.

SUMMARY OF THE INVENTION

It is, therefore, a primary object of the present invention to provide an array of M×N actuated mirrors, wherein each of the actuated mirrors, comprising an electrodisplacive layer and an elastic layer, is capable of relieving the stress developed during a normal operation thereof between the electrodisplacive layer and the elastic layer.

It is another object of the present invention to provide a method for manufacturing such an array of M×N actuated mirrors.

In accordance with one aspect of the present invention, there is provided an array of M×N thin film actuated mirrors for use in an optical projection system, each of the M×N thin film actuated mirrors capable of causing a deviation in the optical path of an incident light beam, said array comprising: an active matrix including a substrate, a conduction line pattern for carrying a bias voltage to each of the thin film actuated mirrors, an array of M×N transistors, each of the transistors being capable of providing an electrical signal to each of the thin film actuated mirrors, and an array of M×N connecting terminals, wherein each of the connecting terminals is connected electrically to each of the transistors; an array of M×N supporting members, each of the supporting members being provided with a conduit; and an array of M×N thin film actuating structures, each of the thin film actuating structures including a first layer made of an electrically conducting and light reflecting material, an electrodisplacive layer having a top and a bottom surfaces, a second layer made of an electrically conducting material, and an elastic layer made of a ceramic, the first and the second layers being placed oil the top and the bottom surfaces of the electrodisplacive layer, respectively, the elastic layer being placed on bottom of the second layer, each of the actuating structures being divided into a proximal and a distal ends, the proximal end of each of the actuating structures being secured on top of each of the supporting members, the first layer in each of the actuating structures being divided into a proximal and a distal ends by a gap, the proximal and the distal ends being separated physically and electrically from each other, the proximal end thereof being in an electrical contact with the conduction line pattern to thereby allow it to function as a bias electrode and the distal end thereof to function as a mirror for reflecting the light beam, and the second layer therein is connected electrically to the connecting terminal connected to the transistor through the conduit in each of the supporting members to thereby allow it to function as a signal electrode, wherein the electrical signal applied across the electrodisplacive layer in each of the actuating structures between the proximal end of first layer and the second layer causes a deformation thereof, and hence said each of the actuating structures including the distal end of the first layer acting as the mirror, thereby changing the optical path of the incident light beam.

In accordance with another aspect of the present invention, there is provided a method for manufacturing said array of M×N thin film actuated mirrors, said method comprising the steps of: (a) providing an active matrix having a top surface, the active matrix including a substrate, an array of M×N transistors, an array of M×N connecting terminals on the top surface thereof and a conduction line pattern; (b) forming a sacrificial layer on the top surface of the active matrix in such a way that the sacrificial layer completely covers the array of M×N connecting terminals; (c) removing portions of the sacrificial layer surrounding each of the connecting terminals; (d) forming a supporting member around each connecting terminals by filling the portions with an insulating material; (e) depositing an elastic layer, made of a ceramic, on top of the sacrificial layer including the supporting members; (f) forming a conduit in each of the supporting members, each of the conduit extending from top of the elastic layer to each of the connecting terminals, wherein the conduit is connected electrically to the transistor; (g) depositing a second thin film layer made of an electrically conducting material on top of the elastic layer; (h) forming an electrodisplacive layer on top of the second layer; (i) depositing a first thin film layer made of an electrically conducting and light reflecting material to form an actuated mirror structure; (j) patterning the actuated mirror structure into an array of M×N semifinished actuated mirror structures; (k) patterning the first thin film layer in each of the semifinished actuated mirrors structures into a proximal and a distal ends to form an array of M×N actuated mirror structures, wherein the proximal and the distal ends thereof are separated, physically and electrically from each other by a gap and the proximal end thereof is in an electrical contact with the conduction line pattern and (1) removing the sacrificial layer is each of the actuated mirror structures to thereby form said array of M×N thin film actuated mirrors.

BRIEF DESCRIPTION OF THE DRAWINGS

The above and other objects and features of the present invention will become apparent from the following description of preferred embodiments given in conjunction with the accompanying drawings, wherein:

FIG. 3 represents a top view of a thin film actuated mirror constituting the array shown in FIG. 2; and FIGS. 4(A) to 4(H) reproduce schematic cross sectional views setting forth the manufacturing steps for the preferred embodiment in accordance with the present invention.

DETAILED DESCRIPTION OF THE PREFERRED EMBODIMENTS

Figure 1:
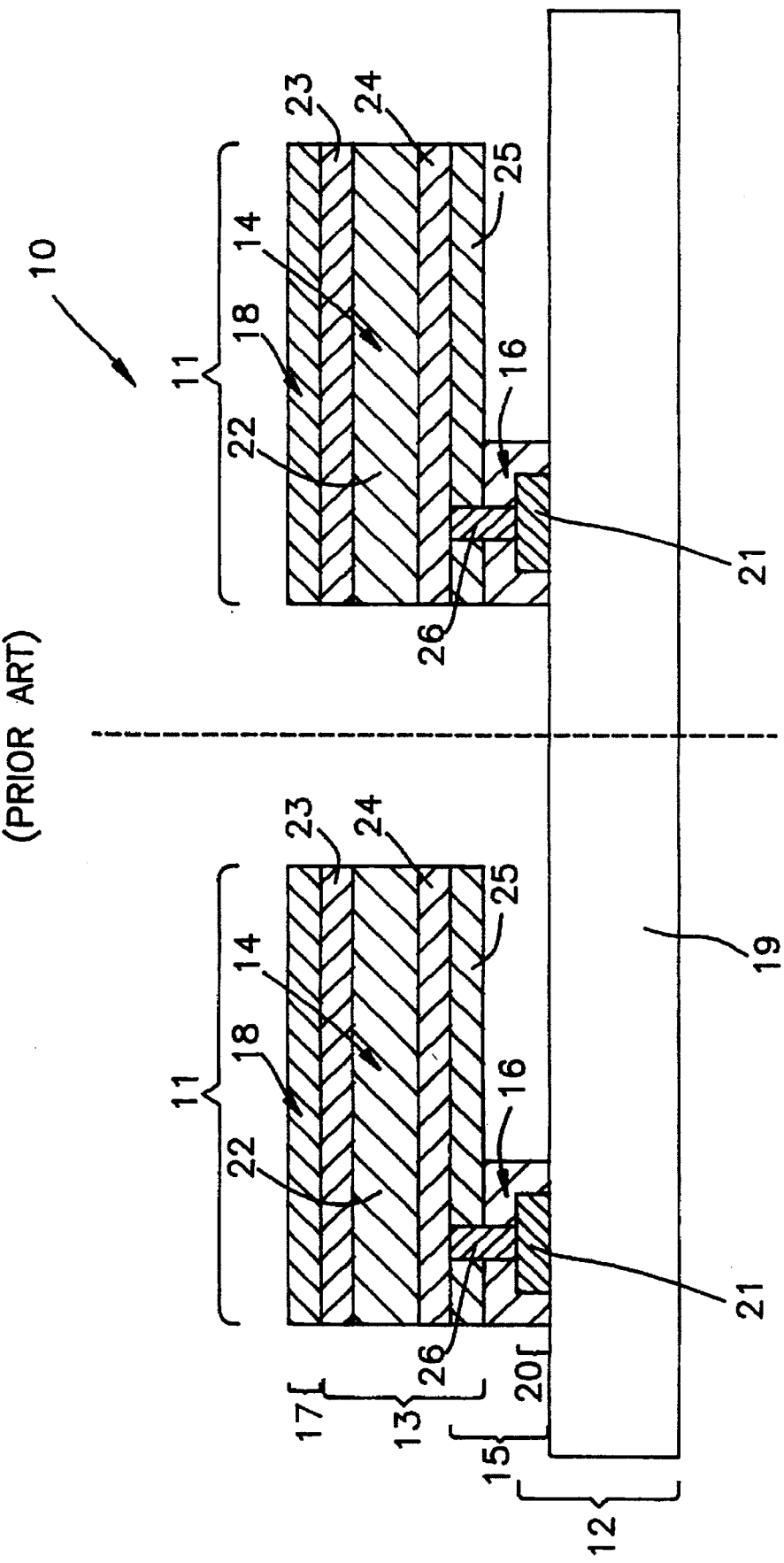
FIG. 1 shows a cross sectional view of an array of M×N thin film actuated mirrors previously disclosed.
Figure 2:
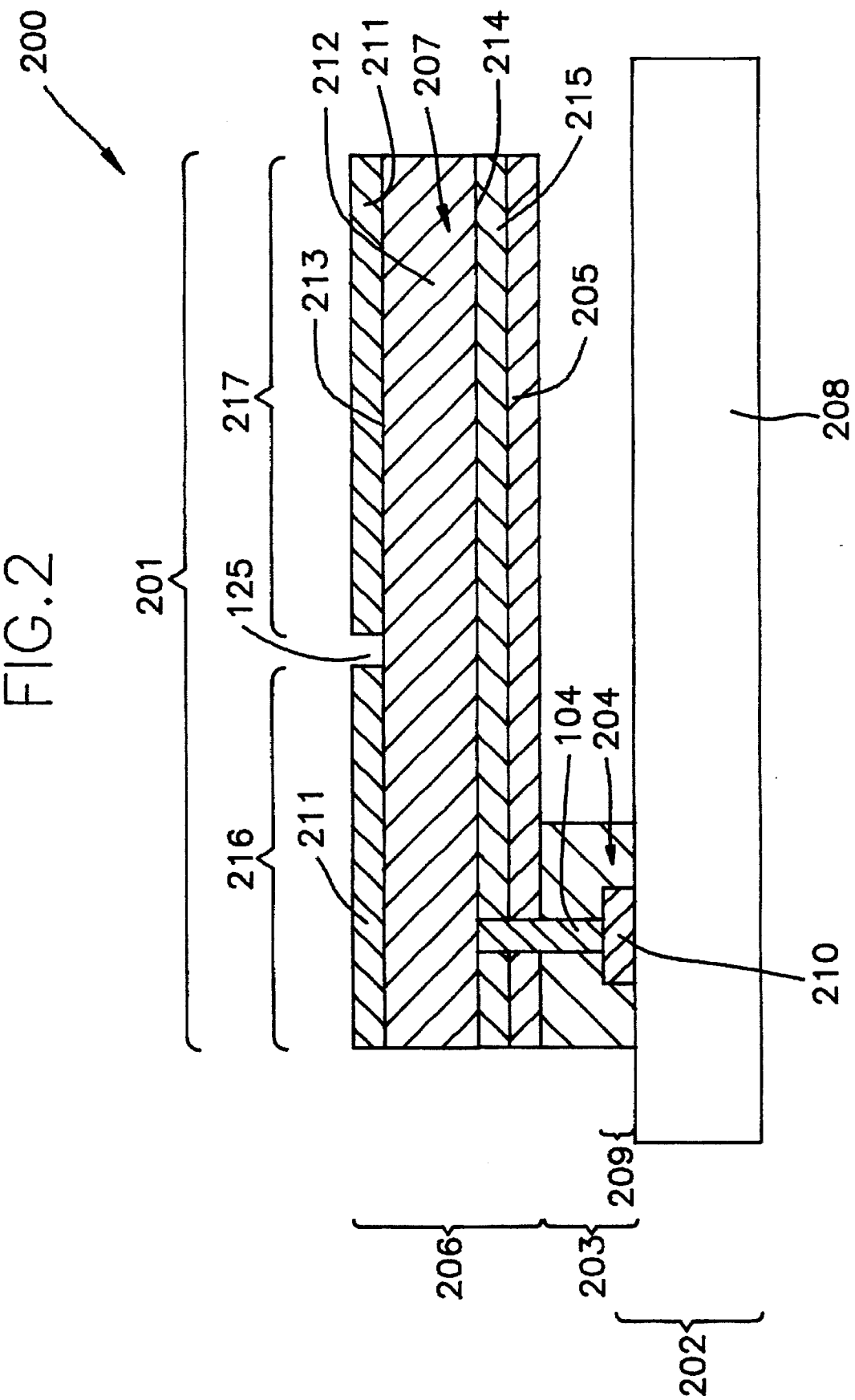
FIG. 2 illustrates a cross sectional view of an array of M×N thin film activated mirrors in accordance with a preferred embodiment the present invention.

Referring now to FIGS. 2 to 4, there are provided schematic cross sectional and top views of an array 200 of M×N thin film actuated mirrors 201 for use in an optical projection system and a method for the manufacture thereof, wherein M and N are integers, in accordance with preferred embodiments of the present invention. It should be noted that like parts appearing in FIGS. 2 to 4 are represented by like reference numerals.

In FIG. 2, there is illustrated a cross sectional view of the array 200 comprising an active matrix 202, an array 203 of M×N supporting members 204, and an array 206 of M×N thin film actuating structures 207.

The active matrix 202 includes a substrate 208, an array of M×N transistors(not shown), an array 209 of M×N connecting terminals 210, and a conduction line pattern (not shown), wherein each of the transistors is used for providing an electrical signal to each of the thin film actuated mirrors 201, the conduction line pattern is used for providing a bias voltage to each of the thin film actuated mirrors 201, and each of the connecting terminals 210 is connected electrically to each of the transistors.

Each of the supporting members 204, made of an insulating material, e.g., silicon nitride($Si_3N_4$), is provided with a conduits 104, made of a metal, e.g., tungsten(W), wherein each of the conduits 104 located in each of the supporting members 204 is connected electrically to the each of the connecting terminals 210 connected to each of the transistors.

Each of the actuating structures 207 includes a first layer 211, an electrodisplacive layer 212 having a top and a bottom surfaces 213, 214, a second layer 215 and an elastic layer 205. Furthermore, each of the actuating structures 207 is provided with a proximal and a distal ends 216, 217. The first layer 211 is made of an electrically conducting and light reflecting material, e.g., silver(Ag) and has a thickness of 500~2000 Å, the electrodisplacive layer 212 is made of a piezoelectric material, e.g., PZT, or an electrostrictive material, e.g., PMN, and has a thickness of 0.7~2 μm, the second layer 215 is made of an electrically conducting material, e.g., platinum(Pt), and has a thickness of 0.7~2 μm, and the elastic layer 205 is made of an insulating material, e.g., $SiO_2$.

In each of the actuating structures 207, the first and the second layers 211, 215 are placed on the top and the bottom surfaces 213, 214 of the electrodisplacive layer 212 and the elastic layer 205 is placed on bottom of the second layer 215, and the proximal end 216 thereof is secured on top of each of the supporting members 204. The second layer 215 in each of the actuating structures 207 is connected to the transistor through the conduit 104 to thereby allow it to function as a signal electrode. As shown in FIG. 3, the first layer 211 is divided into a proximal and distal ends 216, 217, wherein the proximal and the distal ends 216, 217 thereof are separated physically and electrically from each other by a gap 125, and the proximal end 216 thereof is in an electrical contact with the conduction line pattern thereby allowing it to function as a bias electrode and the distal end thereof to function as a mirror for reflecting the light beam.

When an electrical signal is applied across the electrodisplacive layer 212 between the proximal end of the first and the second layers 211, 215, it results in a deformation thereof, and hence a deformation of the actuating structure 207, including the distal end of the first layer 211 acting as the mirror, thereby changing the optical path of the incident light beam.

Figure 4A:
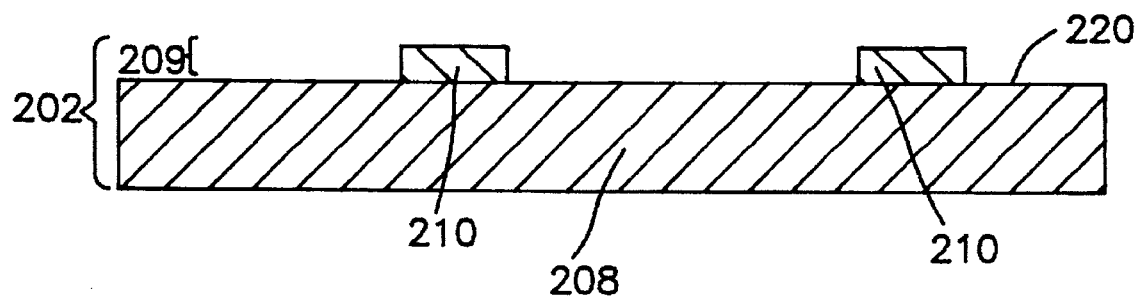

There are illustrated in FIGS. 4A to 4H the manufacturing steps involved in manufacturing the inventive array 200 of M×N thin film actuated mirrors 201. The process for manufacturing the array 200 begins with the preparation of the active matrix 202 having a top surface 220, comprising the substrate 208, the array of M×N transistors(not shown), the conduction line pattern(not shown), and the array 209 of M×N connecting terminals 210, as shown in FIG. 4A.

Figure 4B:
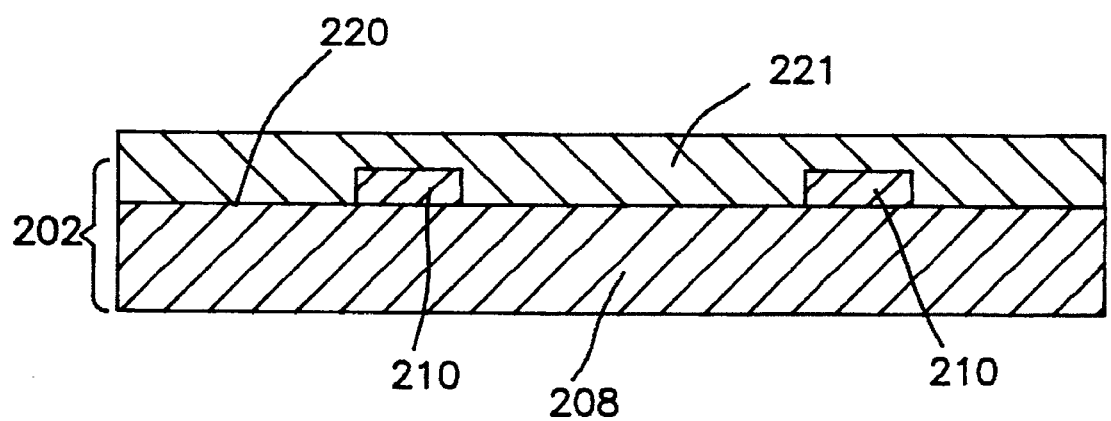

In the subsequent step, there is formed on the top surface 220 of the active matrix 202 a sacrificial layer 221 having a thickness of 1~2 μm and made of a metal, e.g., copper(Cu) or nickel(Ni), a phosphor-silicate glass(PSG) or poly-Si, by using a sputtering method if the sacrificial layer 221 is made of a metal, a chemical vapor deposition(CVD) method or a spin coating if the sacrificial layer 221 is made of a PSG, and a CVD method if the sacrificial layer is made of poly-Si, as illustrated in FIG. 4B.

Figure 4C:
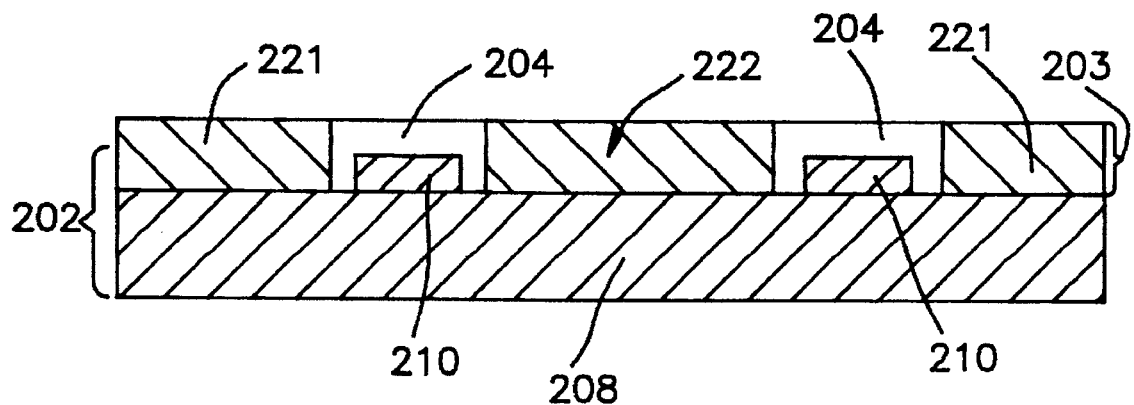

Subsequently, there is formed a first supporting layer 222 including the array 203 of M×N supporting members 204 and the sacrificial layer 221, wherein the first supporting layer 222 is formed by: creating an array of M×N empty slots(not shown) using a photolithography method, each of the empty slots being located around each of the connecting terminals 210; and forming a supporting member 204, made of an insulating material, e.g., $Si_3N_4$, in each of the empty slots located around each of the connecting terminals 210, using a sputtering method or a CVD method, as shown in FIG. 4C.

In the following step, an elastic layer 205, made of an insulating material, e.g., silicon oxide($SiO_2$), is formed on top of the sacrificial layer 221 including the supporting members 204.

Figure 4D:
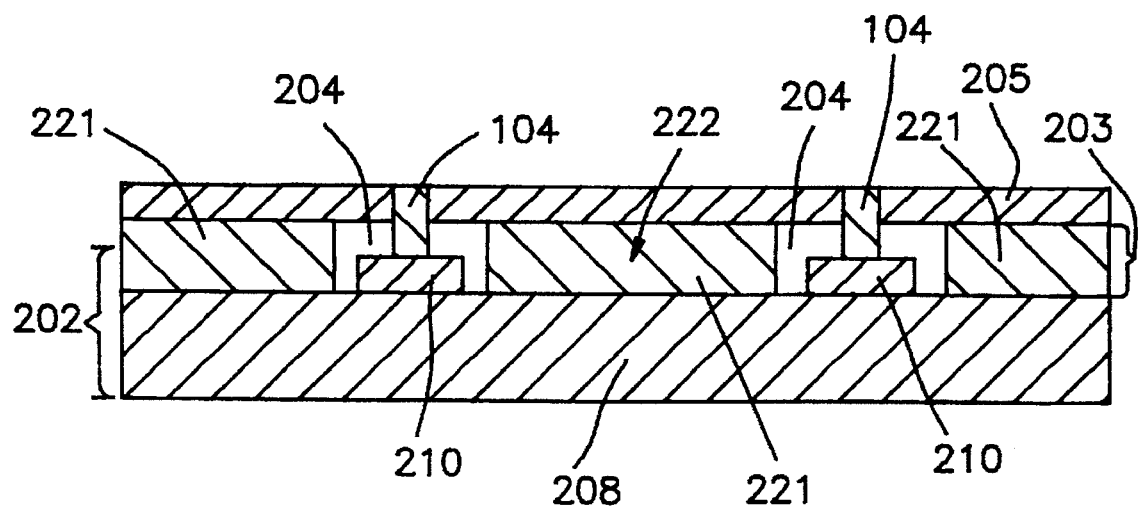

Thereafter, the conduit 104, made of a metal, e.g., W, is formed in each of the supporting members 204 by: first creating a hole, the hole extending from top of the elastic layer 205 to top of the corresponding connecting terminal 210, using an etching method; and filling therein with a metal, e.g., W, as depicted in FIG. 4D.

Figure 4E:
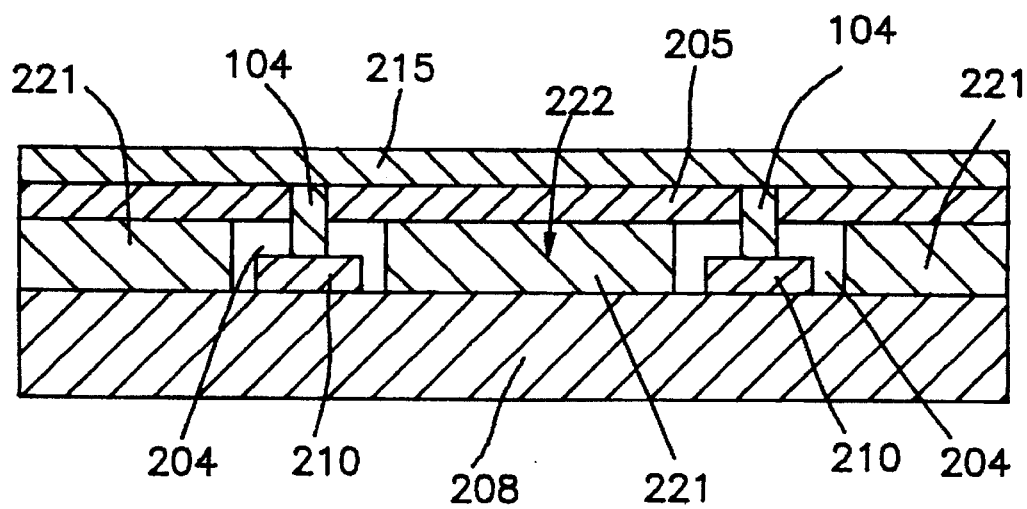

Subsequently, as shown in FIG. 4E, a second thin film layer 215, made of an electrically conducting material, e.g., Pt, and having a thickness of 0.7~2 μm, is formed on top of the elastic layer 205 including the conduits 104 using a sputtering method.

Figure 4F:
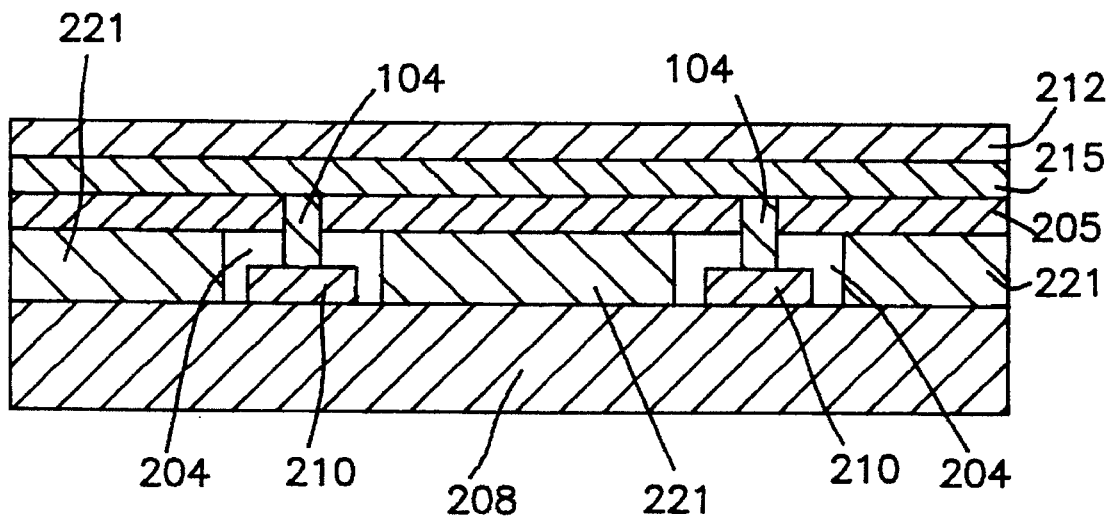

Thereafter, as shown in FIG. 4F, a thin film electrodisplacive layer 212, made of a piezoelectric material, e.g., PZT, or an electrostrictive material, e.g., PMN, and having a thickness of 0.7~2 μm, is formed on top of the second thin film layer 215 using a sol-gel method or a sputtering method, and then is heat treated to allow a phase transition thereof to take place. Since the electrodisplacive layer 212 is sufficiently thin, there is no need to pole it; it can be poled with the electrical signal applied during the operation of the corresponding actuated mirror 201.

Figure 4G:
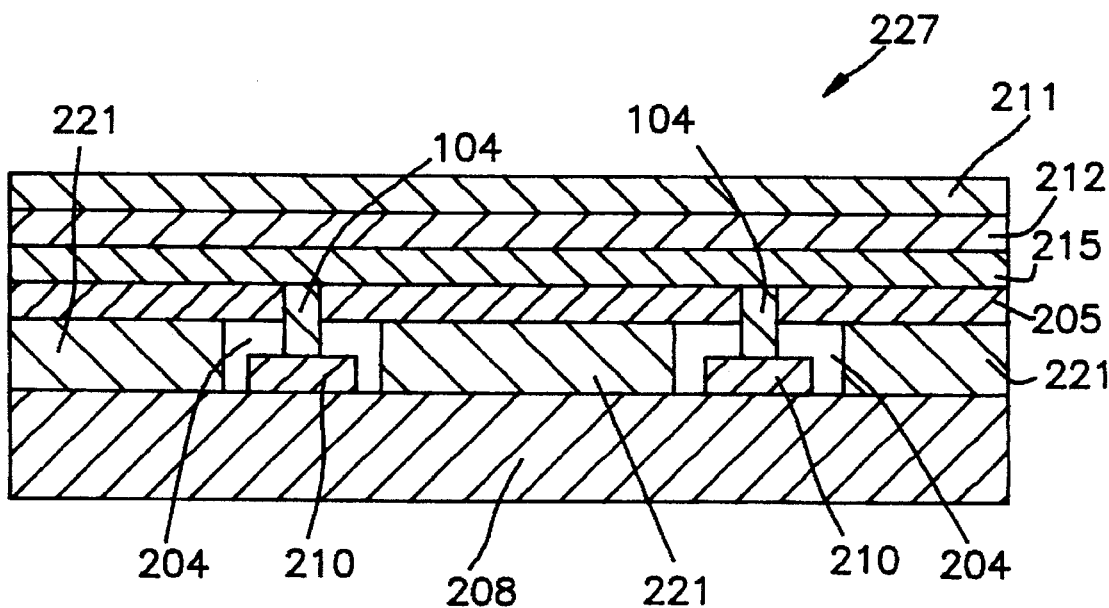

In the ensuing step, as depicted in FIG. 4G, a first thin film layer 211 made of an electrically conducting and light reflecting material, e.g., Ag, and having a thickness of 500~2000 Å, is formed on top of the thin film electrodisplacive layer 212 using a sputtering methods, resulting in an actuated mirror structure 227.

The actuated mirror structure 227 is then patterned into an array of M×N semifinished actuated mirror structures (not shown) using a photolithography method or a laser trimming method. The first thin film layer 211 in each of the semifinished actuated mirror structures is then patterned into a proximal and a distal ends to form an array of M×N actuated mirror structures(not shown.) using a photolithography method, wherein the proximal and the distal ends thereof are physically and electrically separated from each other by the gap 125, and the proximal end thereof is in an electrical contact with the conduction line pattern, thereby functioning as the bias electrode.

The sacrificial layer 221 in each of the actuated mirror structures is then removed using an etching method to form the array 200 of M×N thin film actuated mirrors 201, as shown in FIG. 4H.

While the present invention has been described with respect to certain preferred embodiments only, other modifications and variations may be made without departing from the scope of the present invention as set forth in the following claims.

What is claimed is:

1. An array of M×N thin film actuated mirrors for use in an optical projection system, each of the M×N thin film actuated mirrors capable of causing a deviation in the optical path of an incident light beam, said array comprising:

an active matrix including a substrate, a conduction line pattern for carrying a bias voltage to each of the thin film actuated mirrors, an array of M×N transistors, each of the transistors being capable of providing an electrical signal to each of the thin film actuated mirrors, and an array of M×N connecting terminals, wherein each of the connecting terminals is connected electrically to each of the transistors;

an array of M×N supporting members, each of the supporting members being provided with a conduit; and an array of M×N thin film actuating structures, each of the thin film actuating structures including a first layer made of an electrically conducting and light reflecting material, an electrodisplacive layer having a top and a bottom surfaces, a second layer made of an electrically conducting material, and an elastic layer made of an insulating material, the first and the second layers being placed on the top and the bottom surfaces of the electrodisplacive layer, respectively, the elastic layer being placed on bottom of the second layer, each of the actuating structures being divided into a proximal and a distal ends, the proximal end of each of the actuating structures being secured on top of each of the supporting members, the first layer in each of the actuating structures being divided into a proximal and a distal ends by a gap, the proximal and the distal ends being separated physically and electrically from each other, the proximal end thereof being in an electrical contact with the conduction line pattern to thereby allow it to function as a bias electrode and the distal end thereof to function as a mirror for reflecting the light beam, and the second layer therein is connected electrically to the connecting terminal connected to the transistor through the conduit in each of the supporting members to thereby allow it to function as a signal electrode, wherein the electrical signal applied across the electrodispacive layer in each of the actuating structures between the proximal end of the first layer and the second layer causes a deformation thereof, and hence said each of the actuating structures including the distal end of the first layer acting as the mirror, thereby changing the optical path of the incident light beam.

2. The array of claim 1, wherein the second layer in each of the actuated mirrors has a thickness of 0.7~2 μm.

3. The array of claim 1, wherein the electrodisplacive layer in each of the actuated mirrors has a thickness of 0.7~2 μm.

4. The array of claim 1, wherein the first layer in each of the actuated mirrors has a thickness of 500~2000 Å.

5. The array of claim 1, wherein the electrodisplacive layer is made of a piezoelectric material or an electrostrictive material.

6. A method for manufacturing an array of M×N thin film actuated mirrors, said method comprising the steps of:

(a) providing an active matrix having a top surface, the active matrix including a substrate, an array of M×N transistors, an array of M×N connecting terminals on the top surface thereof and a conduction line pattern;

(b) forming a sacrificial layer on the top surface of the active matrix in such a way that the sacrificial layer completely covers the array of M×N connecting terminals;

(c) removing portions of the sacrificial layer surrounding each of the connecting terminals;

(d) forming a supporting member around each connecting terminals by filling the portions with an insulating material;

(e) depositing an elastic layer, made of an insulating material, on top of the sacrificial layer including the supporting members;

(f) forming a conduit in each of the supporting members, each of the conduits extending from top of the elastic layer to each of the connecting terminals, wherein the conduit is connected electrically to the transistor;

(g) depositing a second thin film layer made of the an electrically conducting material on top of the elastic layer;

(h) forming an electrodisplacive layer on top of the second layer;

(i) depositing a first thin film layer made of an electrically conducting and light reflecting material to form an actuated mirror structure;

(j) patterning the actuated mirror structure into an array of M×N semifinished actuated mirror structures;

(k) patterning the first thin film layer in each of the semifinished actuated mirrors structures into a proximal and a distal ends to form an array of M×N actuated mirror structures, wherein the proximal and distal ends thereof are separated physically and electrically from each other by a gap and the proximal end thereof is in an electrical contact with the conduction line pattern; and (1) removing the sacrificial layer is each of the actuated mirror structures to thereby form said array of M×N thin film actuated mirrors.

7. The method of claim 6, wherein the sacrificial layer is formed by using a sputtering method if the sacrificial layer is made of a metal, a chemical vapor deposition method if the sacrificial layer is made of a phosphor-silicate glass, or a spin coating method if the sacrificial layer is made of a poli-Si.

8. The method of claim 6, wherein the second thin film layer is formed by using a sputtering method.

9. The method of claim 6, wherein the thin film electro-displacive layer is formed by using a sol-gel method or sputtering method.

10. The method of claim 6, where the first thin film layer is formed by using a sputtering method or a vacuum evaporation method.

11. The method of claim 6, wherein the conduits are formed by using a photolithography method, followed by a sputtering method.

12. The method of claim 6, wherein the actuated mirror structures is patterned using a photolithography method or a laser trimming method.

13. The method of claim 6, wherein the sacrificial layer is removed by an etching method.

* * * * *